UNITED STATES PATENT OFFICE.

JOHAN D. FREDERIKSEN, OF LITTLE FALLS, NEW YORK, ASSIGNOR OF ONE-HALF TO DAVID H. BURRELL, OF SAME PLACE.

METHOD OF MAKING CHEESE.

SPECIFICATION forming part of Letters Patent No. 482,897, dated September 20, 1892.

Application filed January 30, 1891. Serial No. 379,623. (No specimens.)

*To all whom it may concern:*

Be it known that I, JOHAN D. FREDERIKSEN, a citizen of the United States, residing at Little Falls, in the county of Herkimer and State of New York, have invented new and useful Improvements in Methods of Making Cheese, of which the following is a specification.

This invention has the object to produce cheese which contains the albumen of the milk or skim-milk from which the cheese is made, and as a by-product whey which is free from albumen. The nitrogenous constituents of milk consist, essentially, of caseine, which is coagulated by rennet, and of albumen, which is not coagulated by rennet. Full milk contains, on an average, three and one-half per cent. of caseine and one-half per cent. of albumen. The albumen resembles the caseine in nutritive properties, and it is therefore desirble to incorporate the albumen with the curd in making cheese; but so far no practical method of accomplishing this end has been discovered because the high temperature required for coagulating the albumen destroys the capacity of the milk to be coagulated by rennet. Full or new milk and skim-milk which has not been sterilized by heating contains numerous bacteria which are necessary for the curdling action of the rennet. By heating the milk to or near to the boiling-point these bacteria are destroyed, and the consequence is that rennet added to such sterilized milk or skim-milk is unable to curdle the same. In order to restore to the sterilized milk or skim-milk the property of being curdled by rennet, it is necessary to supply the milk or skim-milk with a fresh growth of these bacteria. My invention is based upon this discovery, and is practiced as follows:

The new milk or the skim-milk is heated to a temperature at which the albumen is thickened or coagulated, a temperature of from 190° to 200° Fahrenheit being preferred in order to accomplish this end quickly. I prefer to heat the milk so far as possible by steam or boiling water indirectly applied—for instance, by placing the milk in a cheese-vat and applying the steam or boiling water to the under side of the metallic bottom thereof. The temperature of the milk can be readily raised by this means to from 125° to 135° Fahrenheit. The further heating of the milk is then effected by injecting steam directly into the milk until it has reached a temperature of from 190° to 200° Fahrenheit. I prefer to use high-pressure steam for this injection in order to keep the volume of water which is thereby added to the milk down to a minimum and to effect the final heating as quickly as possible. The albumen being coagulated and prepared for incorporation with the curd, the milk is next cooled to a temperature favorable to the development of bacteria. This temperature is, in ordinary weather, from 80° to 90° Fahrenheit, and in cold weather 95° Fahrenheit. This cooling is preferably effected by leading a current of cold water under the bottom of the cheese-vat or through pipes submerged in the milk, and stirring the milk from time to time.

If it is desired to keep the sterilized milk until the next day before proceeding with the process, I cool the heated milk to from 50° to 55° Fahrenheit or sufficiently low to fully preserve it, and the next day I heat it again to from 80° to 95° Fahrenheit. The cooled milk is next supplied with fresh bacteria by adding a starter or ferment containing the same. A starter suitable for the purpose can be prepared by taking about four per cent. of the entire quantity of milk which is to be made into cheese before it is sterilized and heating said four per cent. of milk to about 90° Fahrenheit, setting it for about twenty-four hours in a can surrounded by a non-conductor of heat to prevent it from cooling, and allowing it to become sour. When fully loppered it is ready for use.

If it is desired to proceed with the process immediately after cooling the milk, the starter is set the day before from another batch of milk, while if the milk is kept after cooling until the following day the starter can be made from the same batch of milk. In order to distribute the starter in the batch of milk, I pass it through a fine sieve or piece of cloth and stir it in well. Having added the starter, the milk is left at rest a sufficient length of time to enable the bacteria to multiply and permeate the batch of milk, which requires usually from two to four hours. The milk being now prepared for the action of the rennet, the usual amount of rennet is added to curdle the milk, and the curd is then separated from the whey and treated in the usual manner to produce the cheese.

Instead of the above-described starter, any other suitable ferment may be used—for instance, a ferment containing cultures of bacteria selected with particular reference to their purity and flavor-producing properties.

The increase in yield by this process is very large because the albumen itself is not only added to the cheese, but also the water which is combined with the abumen.

The whey produced by this process is free from albumen, and therefore particularly desirable for the manufacture of milk-sugar, as the whey does not require to be boiled and filtered in order to remove the albumen, but is in a condition to be at once concentrated. This simplifies the process of producing the milk-sugar very materially and considerably reduces the cost of the milk-sugar.

I claim as my invention—

The herein-described method of treating milk or skim-milk for incorporating the albumen in the curd, which consists in heating the milk or skim-milk to a temperature at which the albumen is coagulated or thickened and prepared for incorporation with the curd, then cooling the milk to a temperature which admits of restoring to the sterilized milk the property of being curdled by rennet, then adding to it a starter or ferment to restore this property and allowing the same to act upon or develop in the milk, and then curdling the milk by adding the rennet, substantially as set forth.

Witness my hand this 24th day of January, 1891.

JOHAN D. FREDERIKSEN.

Witnesses:
R. HURLEY,
EMIL L. G. TOBORG.